(12) United States Patent
Riedesser (10) Patent No.: US 12,092,430 B2
(45) Date of Patent: Sep. 17, 2024

(54) TRAINING DEVICE WITH LASER-ASSISTED WEAPON

(71) Applicant: Simgun GmbH, Goetzis (AT)

(72) Inventor: Patrick Riedesser, Koblach (AT)

(73) Assignee: SIMGUN GMBH, Goetzis (AT)

( * ) Notice: Subject to any disclaimer, the term of this patent is extended or adjusted under 35 U.S.C. 154(b) by 322 days.

(21) Appl. No.: 17/323,937

(22) Filed: May 18, 2021

(65) Prior Publication Data

US 2021/0364254 A1 Nov. 25, 2021

(30) Foreign Application Priority Data

May 19, 2020 (DE) ...................... 10 2020 113 463.0

(51) Int. Cl.
*F41G 3/26* (2006.01)
(52) U.S. Cl.
CPC ................................. *F41G 3/2655* (2013.01)
(58) Field of Classification Search
CPC .... F41G 3/2655; F41A 33/02; F41H 13/0018; G09B 9/003; G09B 9/006
USPC ......................................................... 434/22
See application file for complete search history.

(56) References Cited

U.S. PATENT DOCUMENTS

| | | | |
|---|---|---|---|
| 5,742,251 | A | 4/1998 | Gerber |
| 7,872,849 | B2 | 1/2011 | Elliott, Jr. |
| 9,033,710 | B2 | 5/2015 | Quail |
| 9,700,786 | B2 | 7/2017 | Ma |
| 2010/0227299 | A1 | 9/2010 | Ferris |
| 2012/0064492 | A1* | 3/2012 | Pearce ....................... F41G 3/26 434/22 |
| 2015/0354922 | A1* | 12/2015 | Carriere ................ F41G 3/2655 434/21 |
| 2015/0364052 | A1 | 12/2015 | Blankenship |
| 2016/0371997 | A1* | 12/2016 | Angerer ................... A61N 1/38 |
| 2021/0043011 | A1* | 2/2021 | Gates ....................... G06F 3/013 |

FOREIGN PATENT DOCUMENTS

| | | |
|---|---|---|
| CA | 2778941 A1 | 8/2012 |
| CA | 3118856 A1 | 11/2021 |
| DE | 4108632 A1 | 9/1992 |
| DE | 102020113463 A | 11/2021 |
| EP | 0836069 A1 | 4/1998 |
| EP | 2649401 B1 | 10/2018 |
| EP | 3913314 A1 | 11/2021 |

* cited by examiner

*Primary Examiner* — Robert P Bullington
*Assistant Examiner* — Stephen Alvesteffer
(74) *Attorney, Agent, or Firm* — Browdy and Neimark, PLLC (57) ABSTRACT

Training device (1) with a laser-assisted weapon comprising a central unit (2), at least one receiving unit (8), a laser unit (9) and at least one person-worn pad (9) that can be energized with stimulation current (43), the laser unit (9) of a first training person (11) being arranged on a first weapon (27) and emitting a laser signal (28) in the direction of a receiving unit (8) of a second training person (12), wherein, when the laser signal (28) is detected by the receiving unit (8), this is evaluated as a hit by the central unit (2), and the central unit (2) sends at least one current pulse to the at least one pad (13), wherein, when a hit is detected, the pad (13) delivers a wave-like varying stimulation current (43), which causes muscular contraction pain in the training person.

15 Claims, 7 Drawing Sheets

TRAINING DEVICE WITH LASER-ASSISTED WEAPON

The invention relates to a training device with a laser-assisted weapon.

A training device with a laser-assisted weapon is a realistic firearm simulation (duel simulation) which is used, for example, in tactical training. The simulation is used for training and practice of a police officer, soldier or security officer. Of course, the training device can also be used as a hobby or in the private arena. There, the game is known as laser tag, with users playing out a realistic combat situation indoors or outdoors.

DE 41 08 632 A1 already discloses a laser-assisted weapon action simulator, which comprises a body harness with a receiver, a weapon with a laser transmitter and an electronic receiving unit. In the present embodiment, a training partner is hit with a laser beam from a laser-assisted weapon, with the receiving unit receiving the laser beam and displaying the hit on an LCD display. The disadvantage of this embodiment is that the training person does not actually experience on his own body whether he has been hit by the opponent's laser beam, since the receiving unit only adds up and displays the number of hits.

The document EP 2 649 401 B1 discloses a control device for training exposure to electrical pulses. The control device described therein comprises a control module and a separate activation device, which generates an activation signal when a training person has been hit by an electrical pulse device. For this purpose, the training person wears a vest, which delivers an electric shock to the training person when hit. In addition, the activation device comprises a control module, which is equipped with a processor and a memory, with various shock criteria being stored on the module which the training person can select or adapt for his training. The electric shock is transmitted to the wearer's hip area (belt area) via a rubber-like belt. However, this is only a small area of the human body, so that it cannot reflect a realistic scenario. For example, if the user is hit in the shoulder, he only experiences pain in the hip area.

Furthermore, the electric shocks are single pulses that are delivered to the user with high voltage. The high voltage merely causes current to pass through the body, with the high-voltage pulse starting from a belt electrode being introduced into the user's body and discharged again at another point. Therefore, it only flows through the body. Although the user is contracted with single pulses, there are individual pauses between the pulses. This allows the user to internalize the program flow. In particular, the user recovers quickly in the pauses between the individual pulses, which does not correspond to reality.

U.S. Pat. No. 7,872,849 B2 discloses a laser training device. Here, the user wears a vest, which is equipped with a receiving unit and an electric shock device. When the receiving unit receives a laser beam, an electric shock is generated to the user. The electric shock is in the form of single, periodically repeating, high voltage pulses. Here, too, there is the disadvantage that the user can get used to the sequence of the single pulses and can thus act again in a targeted manner during the pauses between the pulses. In addition, the pulses are transmitted from the vest to fixed points on the wearer's body. The wearer gets used to this pain scenario relatively quickly and can adjust to the pain in this part of the body.

In the prior art, the user only contracted with a brief high-voltage pulse, so that skin burns even occurred in this area of the body. Thus, not only did the contracted muscle hurt, but the skin was also irritated or reddened.

A major disadvantage of the embodiments according to the prior art is that the focus is exclusively on conveying pain to the wearer of the device (training person). While the respective user experiences a brief electrical shock when he is hit, he recovers quickly from this shock pulse. Furthermore, neither a realistic wounding model under changeable conditions nor the inclusion of the wounding process is simulated. In addition, the electric shock is delivered not to the area of the respective hit zone, but only to where the respective electrodes are present.

The object of the present invention is to reflect a more realistic injury scenario for the training person.

The object is achieved by the essential features of the independent claim, in which are recited a training device with a laser-assisted weapon comprising a central unit, at least one receiving unit, a laser unit and at least one person-worn pad that can be energized with stimulation current, the laser unit of a first training person being arranged on a first weapon and emitting a laser signal in the direction of a receiving unit of a second training person, wherein, when the laser signal is detected by the receiving unit, this is evaluated as a hit by the central unit, and the central unit sends at least one current pulse to the at least one pad, wherein when a hit is detected, the pad delivers a wave-like varying stimulation current, which causes muscular contraction pain in the training person.

The embodiment according to the invention has a device for generating electro-muscle stimulation, which simulates the injury and the pain associated therewith by means of electrical muscle contraction.

An essential feature is that the training device has at least one pad which, when a hit is detected, delivers a wave-like varying stimulation current which causes muscular contraction pain in the training person.

Thus, in the embodiment according to the invention, a non-pulse-like, wave-like varying stimulation current is delivered to the pad, whereby the muscles located there are permanently contracted. The stimulation current is thus a continuing, sustained stimulation current. This means that the power supply is not interrupted for a certain period of time, but a permanent stimulation current in irregular waves and strengths is delivered to the user via the pad.

In contrast, in the prior art embodiments, only single pulses were delivered to the pad with interruptions.

The term stimulation current is understood to mean a direct current or (low-frequency) alternating currents for muscle stimulation. The strength and duration of the stimulation current or the pulses can be determined by a predetermined simulation mode. In particular, sudden strong pulses are perceived as ranging from annoying to unpleasant, which corresponds to the pain of a real gunshot wound.

The embodiment according to the invention thus has the advantage that the sustained stimulation current reflects an injury scenario that is relatively close to reality, since continuing or sustained pain is present in the event of a gunshot wound. Due to the different voltages, the pain is also reflected with different levels and depths. Such a pain is felt, for example, as a stabbing or dull pain.

The training device according to the invention also has a memory for a plurality of different simulation modes, with a varying stimulation current pulse with different voltages being delivered to the user after each hit over a certain period of time, so that the individual muscles are contracted and thereby the training person experiences a long-lasting pain or muscle spasm.

The programs on the memory differ and are selected by the controller of the central unit depending on the incoming data. For example, the selection of the respective program is made depending on how often the training person has been hit. Another criterion is where the hit was noticed on the body, e.g., on the chest, back, arm or leg. If, for example, only a hit is detected on the arm, a program is selected which outputs pain with a lower intensity. However, if there is a hit in the chest or back area, a program is selected which outputs pain with a higher intensity. This corresponds to reality, because gunshot wounds to the chest or back area are significantly more painful than gunshot wounds to the arm.

Even a non-lethal gunshot wound with the associated physical impairment can be simulated with the training device according to the invention. The intensity of the pain pulse can be individually set by the training person.

With the embodiment according to the invention, it is possible to reflect individual, different pain scenarios even over a longer period of time, with the consumer, for example, experiencing dull pain again after a certain time, which is reflected by the different voltages (volt numbers). Thus, in the embodiment according to the invention, the contracting does not stop, but is always present, which corresponds to a real injury scenario.

The training device comprises a central unit (body central unit), a receiving unit (e.g., head unit), and a laser unit (laser unit).

The central unit contains the controller, which processes the data from the receiving unit and the laser unit. The central unit also has a memory capable of storing or processing the different (shock) programs. In the preferred embodiment, the central unit is arranged in a body belt or a vest.

In addition, the central unit can have other devices, such as a light, sound or vibration module.

The receiving unit detects the laser signal from a laser unit and evaluates it as a hit. The receiving unit is located, for example, in the area of the training person's upper body. Another receiving unit can be arranged on a helmet or a cap. The receiving unit is connected to the central unit via a cable or radio connection. The helmet receiving unit detects a head hit at a hit angle of 360 degrees. A head hit is indicated by an LED lighting up. This allows the training person to distinguish whether he has hit an opponent on the head or on the body.

In a further preferred embodiment, at least one receiving unit is arranged in the area of the left arm, right arm, left leg, right leg, as well as on the upper body in the front and in the back, each of which detect a hit in this area. At the same time, pads are arranged in each of these areas, which are connected to the central unit and can be controlled separately by it. If, for example, the receiving unit of the left arm receives a laser signal, this signal is forwarded to the central unit, which then controls the pad of the left arm. The training person experiences "pain" only in this area, i.e., only in the left arm, in which the muscles of the left arm are contracted. This allows certain cases of wounding to be mapped very realistically. In particular, pain can only be generated in the area where the hit was detected.

The laser unit can be combined with any weapon and is preferably designed as an infrared laser. This achieves a high level of precision and a range of up to 1,000 meters. In addition, the laser unit can be combined with a bang detector, which detects the shot of the weapon and generates a realistic bang.

In a preferred embodiment, the simulation begins with the first hit with the laser-assisted weapon. The simulation mode initially lasts for two minutes, for example, and corresponds to a non-linear pulse sequence. At the end of the cycle, a constant, strong pulse starts to signal neutralization for 3 seconds. If there is only one hit, the maximum wounding duration is 10 minutes, after which neutralization occurs automatically. In case of multiple hits, the remaining lifetime is reduced by, for example, 50% for each hit. The set cycle of the pulse sequence changes per hit, reducing the time to neutralization and increasing the voltage. However, with a further hit, the hit pulse is inserted into the pulse cycle.

After the first hit, the pain decreases after a certain time, which is reflected by a reduction in the voltage and a reduction in the number of pulses. The decisive factor is that if there is another hit, the pain is reflected by an increase in the pulse and an increase in the voltage, with the stored simulation mode being repeated. This allows a realistic simulation mode of a pain to be reflected. In contrast, in the prior art, a constant, brief high-voltage pulse was introduced into the body only at one point of the body, but this does not correspond to the real pain of a gunshot wound.

The training device has a central unit, with at least one pad being connected to the central unit.

The pads are preferably designed as EMS pads. EMS means electro-muscular stimulation and causes stimulation of the muscles. Bioelectrical pulses that stimulate individual muscle groups pass through the pads. The main advantage of using individual pads is that they can be attached to certain parts of the body, such as the arm, back, abdomen or a leg, thereby causing targeted contraction of the muscles at that part of the body. The EMS pad is equipped with one or two electrodes, for example, that transmit the pulses of the electrical muscle stimulation to the body of the training person.

The EMS pad is made of silicone rubber, for example, and is very thin and flexible. A gel film can be applied to the surface of the pad in order to place the pad on the respective part of the body, whereby the pad adheres to the wearer's skin and the contact resistance between the skin and the electrode is reduced. The pads can also have a self-adhesive surface with which the pads adhere to the skin of the training person.

In a further preferred embodiment, the pads can perform transcutaneous electrical nerve stimulation (TENS).

By arranging individual pads on individual parts of the body, it is possible to map different hit scenarios on the body. If, for example, the user is hit on the arm, this is detected by the central unit and the pad located there is triggered with electrical pulses. The user then experiences pain in his arm, which may extend to other parts of the body.

The embodiment according to the invention uses pads which preferably deliver a low-voltage pulse to the user. Due to the low-voltage pulse, only the muscles are contracted, so that muscle tension or a kind of cramping of the muscle is achieved. This corresponds to a real injury, since here too, in the event of a gunshot wound, the user bends over due to the pain and contracts the muscles. For example, a low-voltage pulse of 60 volts and a maximum of 100 milliamperes are applied to the body.

In a further preferred embodiment, the training device has multiple channels in order to connect a plurality of pads. For example, each limb of the body can be provided with at least two pads so that if the right thigh is hit, pain occurs on the front and back.

However, the invention is not limited to the arrangement of pads. In a further preferred embodiment, the electrodes for stimulating the individual muscle can be arranged within an item of clothing, such as a full-body suit, outer garment, vest, cuff or shirt. The use of an outer garment has the advantage that multiple electrodes can be worn at the same time.

In a further preferred embodiment, the pad has at least one additional sensor with which the training person's heart rate is measured. The central unit and the pad are designed together as a heart rate measuring device which measures the number of heart beats per time interval. For this purpose, the pad can be arranged at any point on the training person's body, for example on the chest or on the arm with a wristband.

Using the measured heart rate, the different load ranges, such as aerobic endurance range (fat burning), anaerobic endurance range, development range, competition-specific endurance, maximum load and stress level can be determined. Based on this data, further training can then be performed and the performance of the individual training person can be improved in a targeted manner.

In a further preferred embodiment, the training device according to the invention has an acceleration sensor (G-sensor) which detects the movement of the training person. The G-sensor is, for example, a three-axis sensor that detects a movement of the training person and transmits this signal to the training device.

A major advantage of using an acceleration sensor is that an even better injury scenario can be displayed. For example, if the training person is hit by the laser-assisted weapon, he receives impulses from the EMS pad, which cause additional muscle contraction. The level of contraction can be so high that the training person has to lie down on the floor. The acceleration sensor now determines whether the "wounded" training person is still moving. If there is movement, the pulse is increased. This corresponds to reality, as movement in the case of a gunshot wound also leads to increased pain. If no movement can be detected, the pulse of the training device is reduced so that a kind of recovery phase occurs.

After the first hit, the controller starts the simulation mode, simultaneously incorporating the data from the acceleration sensor. Based on the data from the receiving unit and the acceleration sensor, the controller decides which electrodes are to be charged with which voltage and which pulse. Depending on the movement of the user, the voltage or the pulses are then increased or decreased again. The controller thus determines whether the training person is still moving. If, for example, the training person continues to run after the hit, the pulse and thus the pain are realistically increased. As soon as the training person rests, the pulse and voltage are reduced, which means that the muscle is no longer contracted as much.

With the embodiment according to the invention, it is possible for the first time to achieve an even more real training mode, since it was previously unknown in the prior art whether the training person continues to run and at the same time experiences constant pain, or whether the training person has sat down and experiences the pain while sitting, for example. Thus, with the embodiment according to the invention, a stress level can be mapped much better, since the wounded person experiences additional or increased pain due to a higher level of voltage when continuing to move.

Preferably, a pulse is applied to the wounded person continuously, i.e. permanently, which was not implemented in the prior art, since here only individual pulses were applied to the wounded person with a constant frequency.

Another exemplary scenario is when the training person who has already been hit is lifted onto a rescue stretcher. This represents a movement that is detected by the acceleration sensor, as a result of which the training device delivers an additional pain impulse to the user.

The acceleration sensor (G-sensor) thus causes an immediate change in pain stimulus when the wounded person moves. In this case, the muscle contraction that is currently passing through is directly increased, and this continues until the wounded person comes to rest again. Depending on the movement and the intensity of the movement, higher pain impulses similar to reality are triggered.

The training device according to the invention can be combined with a base station, which is in permanent radio communication with the respective central units of the training persons. The base station receives all events (hits, kills, etc.) achieved during training with the. These data are displayed accordingly by the computer software. A ranking list with various statistics is generated from this. In addition, further settings can be made via the base station. For example, the type of pain program or the number of shots can be set. The base station is connected to the computer via USB and establishes radio communication between the computer and the individual task forces.

A user is a person, participant or training person who takes part in this simulation exercise. The terms user, person, and training person are to be regarded as synonymous.

The subject matter of the present invention results not only from the subject matter of the individual claims, but also from the combination of the individual claims with each other.

All details and features disclosed in the documents, including the abstract, in particular the spatial configuration shown in the drawings, are claimed to be essential to the invention as far as they are new, individually or in combination, compared to the state of the art.

In the following, the invention will be explained in more detail with reference to drawings which only show one embodiment. Further features and advantages of the invention which are essential to the invention are apparent from the drawings and their description.

The figures show:
FIG. 6: different representations of the pads on the upper body of a training person
FIG. 1 shows a training unit with the training device 1 with a first training person 11 of, for example, Team A and a second training person 12 of, for example, Team B. The training device 1 comprises a central unit 2, a receiving unit 8, a laser unit 9 and at least one pad.

Figure 1:
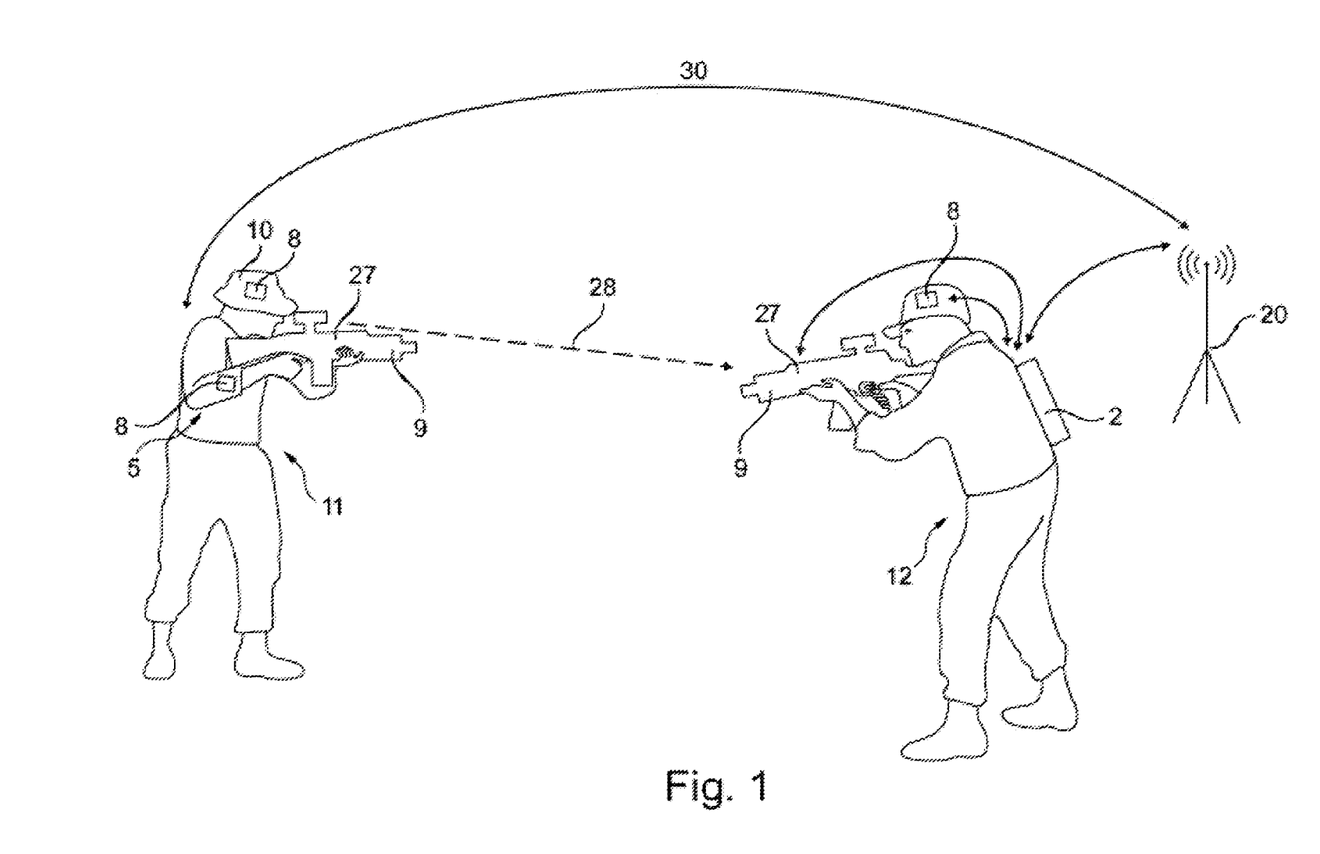
FIG. 1: schematic representation of a training unit

Each training person 11,12 carries a weapon 27 with a laser unit 9. The laser unit 9 is designed as an infrared laser, which has a range of up to 1000 meters. The weapon 27 is a training weapon, such as a BlueGun weapon or an imitation weapon. Of course, it is also possible for a real weapon to be used as the weapon 27, which, however, does not contain live ammunition, but training ammunition. The training person 11, 12 can thus train with his own weapon 27, with which he normally performs his duty as a soldier or police officer.

The laser unit 9 is pushed onto the weapon 27 or detachably connected to it. A bang detector on the laser unit 9 detects the shot of the weapon 27 and triggers the laser.

According to FIG. 1, the first training person 11 emits a laser signal 28 with the laser unit 9 in the direction of the second training person 12. The receiving unit 8 of the second training person 12 receives the laser signal 28 (in the event of a correct hit) and transmits the data to the central unit 2.

Figure 2:
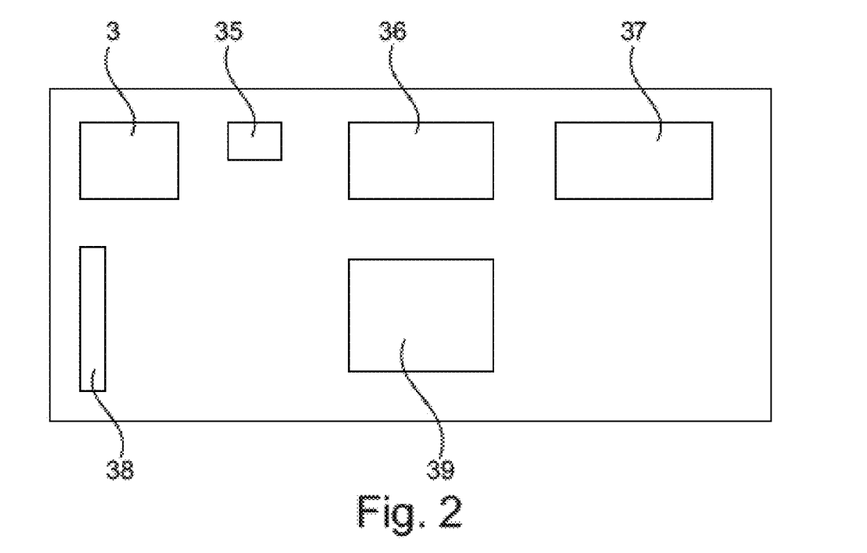
FIG. 2: schematic representation of the central unit

The central unit 2 is preferably designed as a single unit and includes a controller 3 and a memory 29. The central unit 2 is preferably arranged on a vest 5 or belt 4. The central unit 2 has multiple connections (e.g., wireless, wired, Bluetooth) for the individual receiving units 8, as well as multiple connections for the individual pads 13.

The acceleration sensor 22 is preferably arranged in the central unit 2. However, it is also possible that the acceleration sensor 22 is designed as a separate component, which is connected to the central unit 2 via a cable connection.

Figure 4:
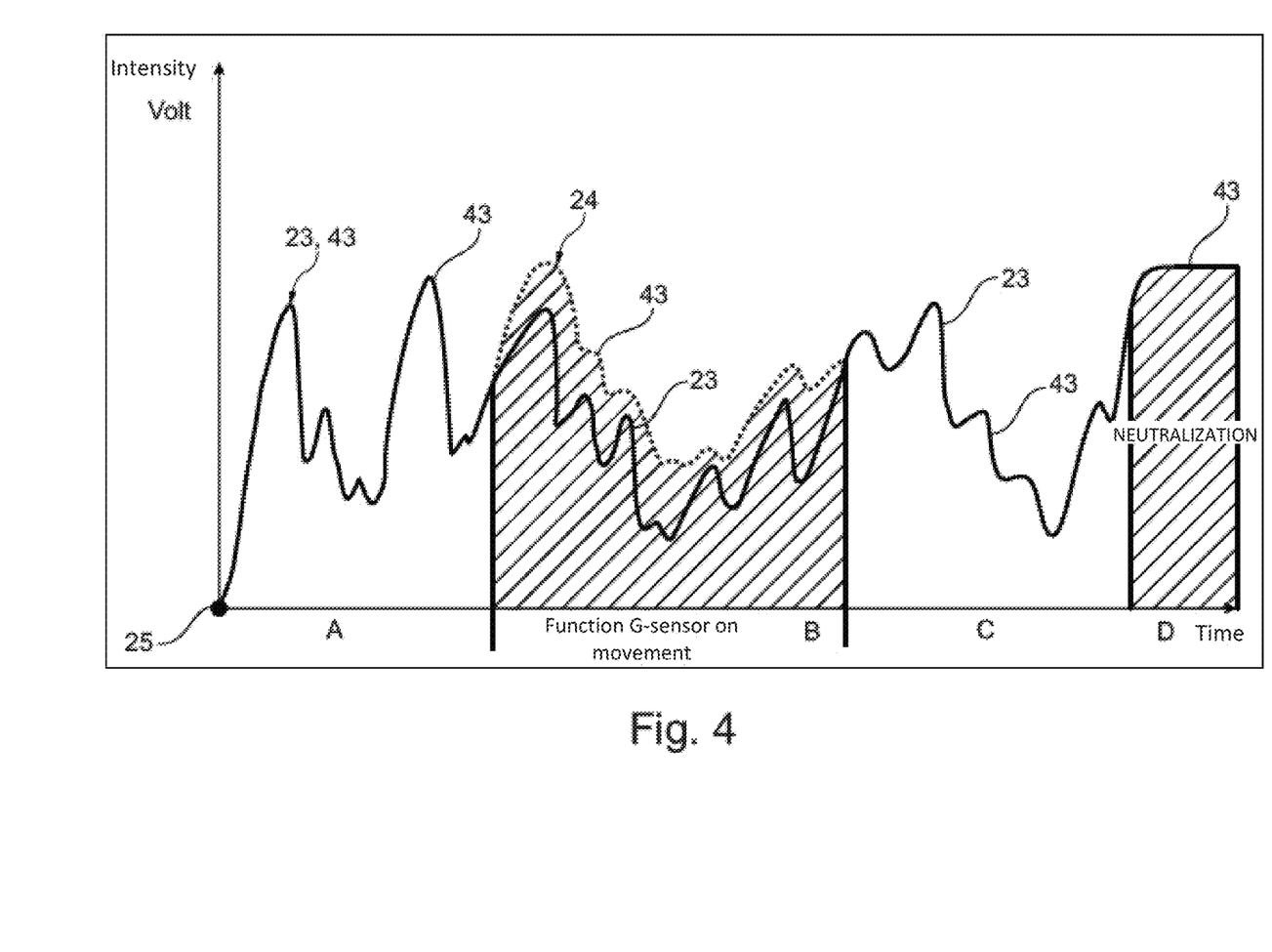
FIG. 4: schematic representation of the intensity following a hit

The memory 29 is designed as a RAM memory and stores the individual simulation modes. The simulation modes are programs which run over a certain time. This is illustrated in FIG. 4 by way of example.

The memory 29 of the central unit 2 can be written to and read out again either via a cable connection or a contactless connection, such as a radio connection or Bluetooth connection.

The controller 3 processes the data which it receives from the at least one receiving unit 8 and, for example, the acceleration sensor 22. If a receiving unit 8 receives a laser signal 28, it is passed on to the central unit, whereupon the controller 3 starts the first simulation mode 23, i.e., a varying, continuing current pulse is sent to the pad 13, with the pulse representing a first wounding scenario. This means that a varying voltage can be delivered to one or more pads 13 in a targeted manner. The pad 13 causes the muscles to contract, which the training person perceives as unpleasant or even as pain.

In addition to the simulation modes 23, 24, the memory 29 can also store certain data 30 which is received by the central unit 2 from, for example, the receiving unit 8, the acceleration sensor 22 or the like during the training unit. The data 30 are transmitted to a base station 20, which then evaluates them.

The transmission of the data 30 starting from the central unit 2 to the base station 20 can, for example, take place permanently with contactless data transmission. However, it is possible for the data 30 to be transmitted to the base station 20 using a USB stick or other medium after the end of the training. The base station 20 evaluates the data 30 using suitable software 21 and displays them graphically, for example.

The software 21 can display the following results, for example:

First hit within which time period;
How many times the individual training person 11, 12 was hit;
How many shots, i.e., how many laser signals 28, the opposing training person 11, 12 has fired until the training person 11, 12 was finally hit. Here, the laser unit 9 of the first training person 11 is compared with the receiving unit 8 of the second training person 12;
In which area of the body of the training person 11, 12 was hit;
Which areas of the body of the training person 11, 12 were hit the most;
Did the training person 11, 12 still move after the first or second hit;
Evaluation of the pulse rate of the individual training person 11, 12;
What is the stress level of the individual training person 11, 12;
Which pain, i.e., which muscle contractions, can the individual training person endure or continue to act.

FIG. 2 shows the training device 2, which has the following components or parts, among others. A controller 2 for processing the incoming data from the receiving units 8, the acceleration sensor 22, the sensor 34 for heart rate measurement, and the stored program.

An ON/OFF switch 35 for activating and deactivating the system. A switch 36, which can be used to control the intensity of the current pulse output. A radio module 37 which transmits the data 30 to the base station 20. A memory 38, which is designed, for example, as a permanently installed, rewritable memory or as a flash memory. And a pulse generator 39 which outputs the current pulses to the individual pads 13 via the outputs.

Figure 3:
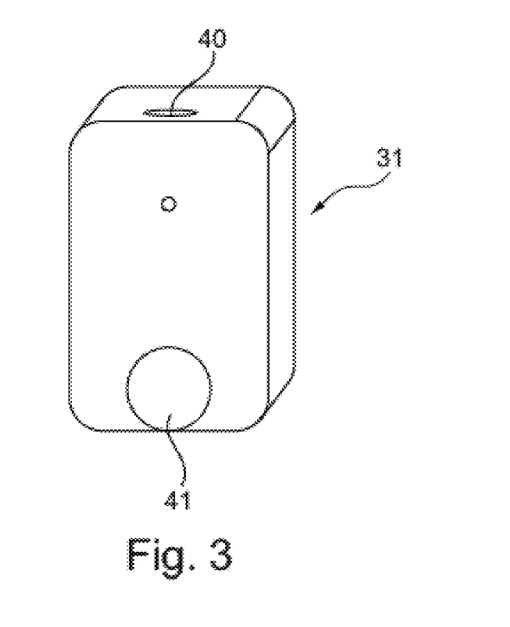
FIG. 3: rehabilitation unit (medic device)

FIG. 3 shows a rehabilitation module 31. Such a module is used by a trainer in order to make the central unit 2 of a neutralized training person 11, 12 ready for use again. The rehabilitation module 31 has an activation sensor 41 which outputs a signal to the respective central unit 2 and resets it to its original state. The activation sensor 41 is activated by a push button 40. The rehabilitation module can also partially reverse a wound. This means that the generated pain is attenuated again, which corresponds to dressing the wound and administering painkillers in real combat.

FIG. 4 is used to illustrate various pain profiles 23, 24 that run after a first hit. When a hit is detected, the pad 13 delivers a wave-like varying stimulation current 43, which causes a muscular contraction pain in the training person.

The Y-axis shows the intensity, which is delivered to the training person 11, 12 in the form of the stimulation current 43. The X-axis shows the course over time.

In section A (X-axis), the training device 1 registers a first hit 25 with its receiving unit 8, which is shown at the origin of the X- and Y-axes. After the hit 25, the training device 1 starts the pain profile 23, which begins with an increasing intensity. The increasing intensity is caused by an increasing stimulation current 43.

It is crucial that the stimulation current 43 persists over time (X-axis). This means that the stimulation current 43 does not have any interruptions or pauses. The training person 11, 12 is thus supplied with a constant, varying stimulation current 43, as a result of which the respective muscles are constantly contracted.

As more time passes after the hit, the pain profile changes automatically. From the time of the first hit, a 10-minute wounding scenario begins at 2-minute intervals in which the pain intensity differs.

Section B shows an additional pain profile 24. Compared to the normal pain profile 23, the pain profile 24 has a stimulation current 43 with a higher intensity and is related to the movement of the training person 11, 12. If the training person 11, 12 moves, this is detected by the acceleration sensor 22. The training device 1 thus detects a movement of the training person 11, 12 and automatically increases the intensity of the stimulation current 43. This means that the stimulation current 43 is increased at the pain profile 24 compared to the normal pain profile 23, so that the muscles of the training person 11, 12 experience increased contraction. There is thus a relationship between the movement of the training person 11, 12 and the level of intensity or the level of the stimulation current 43.

In section C, the training person 11, 12 does not move, so that the normal pain profile 23 runs with changing intensity of the stimulation current 43.

In section D, the training person 11, 12 is neutralized. This condition is reflected by a constant stimulation current 43. The muscles of the training person 11, 12 are thus constantly contracted, which corresponds to a type of muscle spasm.

If the injured person receives only one hit, the inevitable neutralization begins after 10 minutes; if further hits follow, the time until neutralization per hit is reduced according to the program. The number of hits until neutralization is programmable. Here, the time until neutralization is reduced, which is close to reality. In addition, there are parts of the body that initiate neutralization already after the first hit. In the event of immediate neutralization, the "neutralization" wounding scenario also begins immediately. In this case, the normal wounding scenario (10 minutes) is skipped according to the program.

Figure 5:
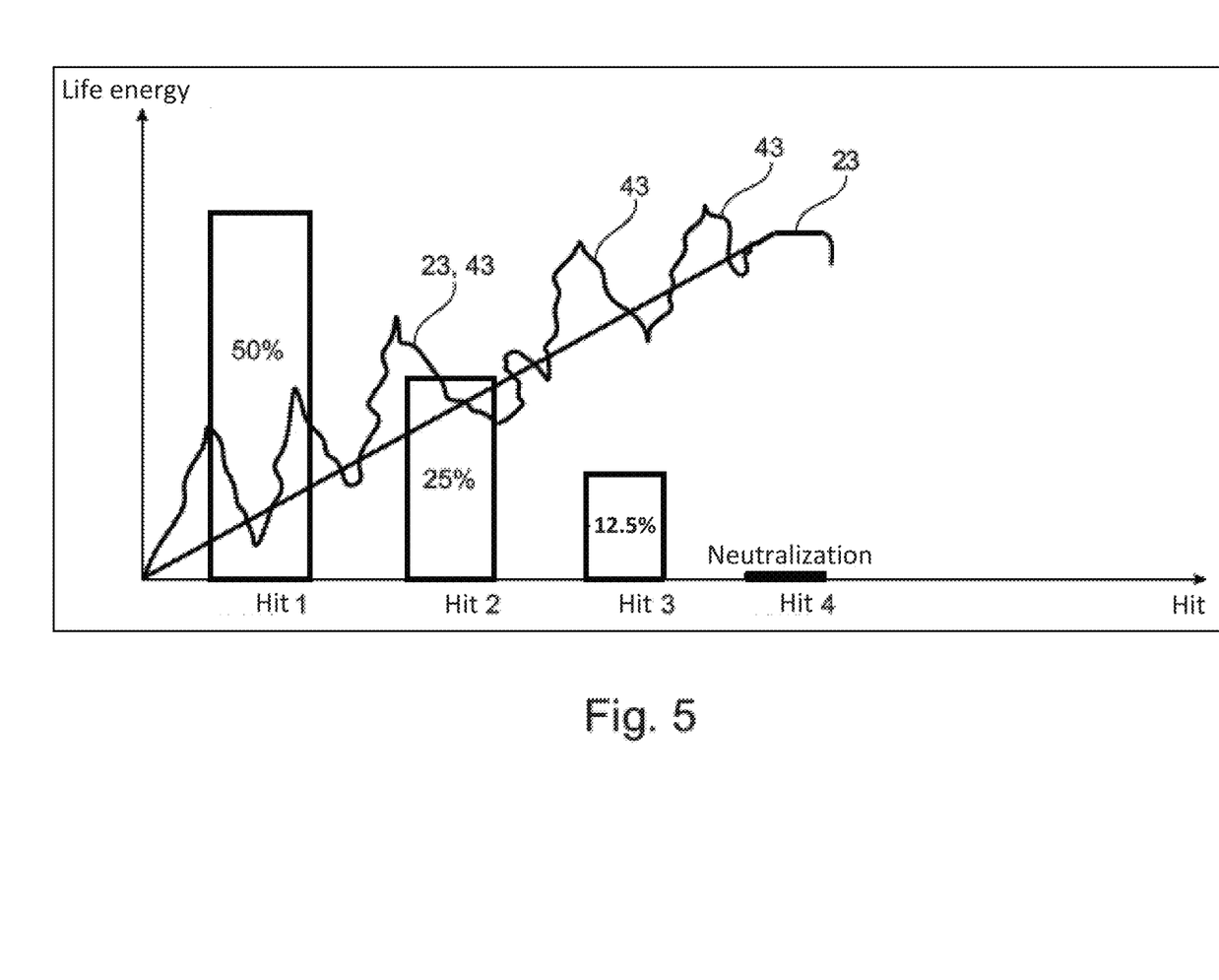
FIG. 5: schematic representation of several hits and life energy

FIG. 5 shows the decreasing life energy with a total of 4 hits with the laser unit 9. The more the life energy decreases, the higher the current pulse, which is represented by the pain profile 23 in the associated stimulation current 43.

FIG. 5 is used to illustrate another injury scenario. If a training person is hit for the first time in a non-lethal zone, the wounding duration is, for example, a maximum of 10 minutes, after which neutralization occurs automatically. If the training person is hit again during this time, the remaining wounding duration is reduced by 50% and the stimulation current is increased. With each further hit, there is a 50% reduction in life energy and with the stimulation current 43 is increased proportionally. With the 4th hit, neutralization takes place automatically, whereby a constant, increased stimulation current 43 is delivered to the training person via the pad(s).

FIG. 5 shows only by way of example that neutralization takes place after four hits. Of course, the number of hits as well as the level of stimulation current 43 can be set or programmed individually. This is done, for example, via the adjustable pain profiles 23, 24.

Figure 6:
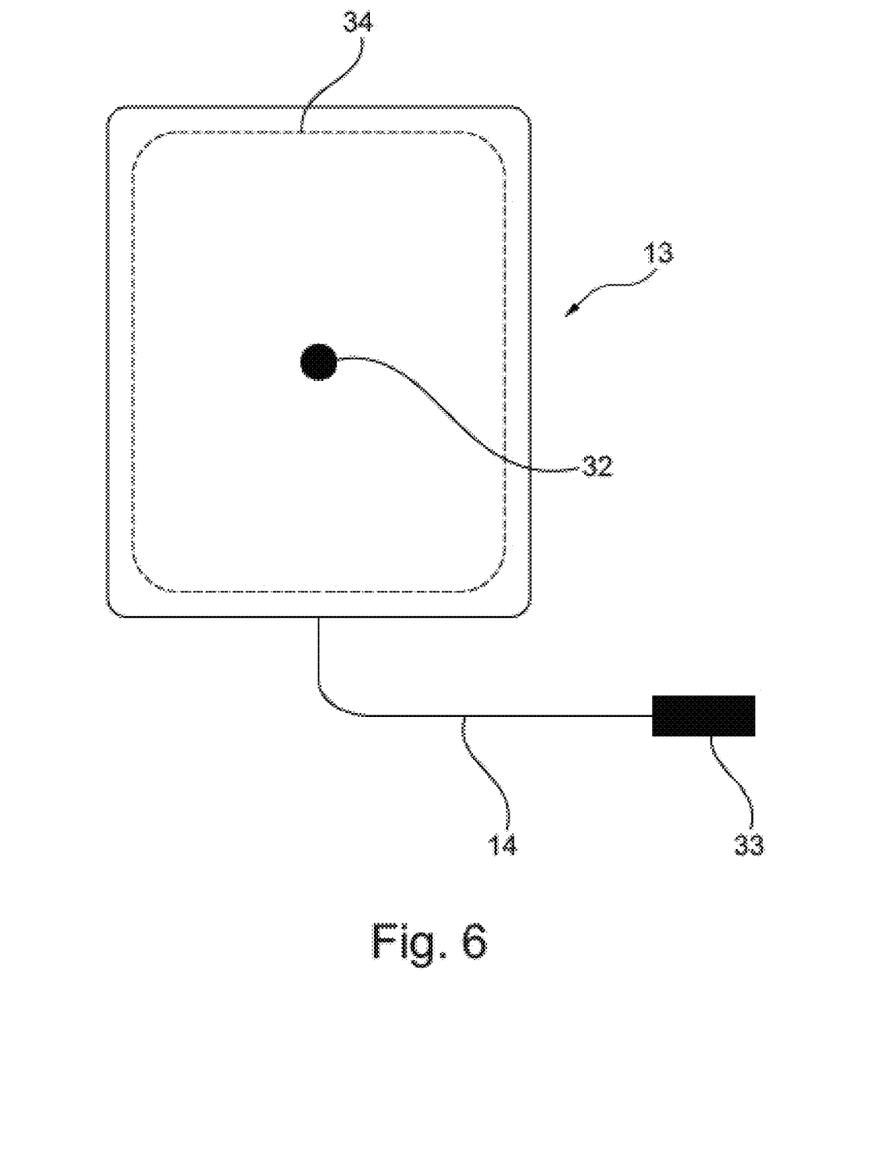
FIG. 6: schematic representation of a pad

FIG. 6 shows the pad 13 which is connected to the central unit 2 via a connecting cable 14. The pad 13 has an electrode 32 which delivers the current pulse to the training person 11, 12. Of course, the pad 13 can also have a plurality of electrodes 32.

In addition, the pad 13 can also have a sensor 34 for measuring the heart rate. The data obtained are then transmitted to the central unit 2 via the connecting cable 14.

The pad 13 can be used either for only transmitting the current pulse with the electrode 32 or for only measuring the heart rate with the sensor 34.

It is also possible for the pad 13 to perform both functions. The central unit 2 detects that, for example, no current pulse is currently being transmitted via the electrode 32 because the receiving unit 8 did not detect a hit in this area of the body. A heart rate measurement can thus be carried out with the sensor 34 during this period.

FIGS. 7a, 7b, 7c, 7d and 7e show different embodiments of the training device 1 according to the invention. Here, the training device 1 is arranged in a vest 7. The vest 7 has a plurality of receiving units 8 which are connected to the central unit 2. Further receiving units 8 are located, for example, on the arms 17. The pads 13 are arranged on different areas of the body. The combination of muscle groups required for muscle stimulation can be freely selected.

Figure 7A:
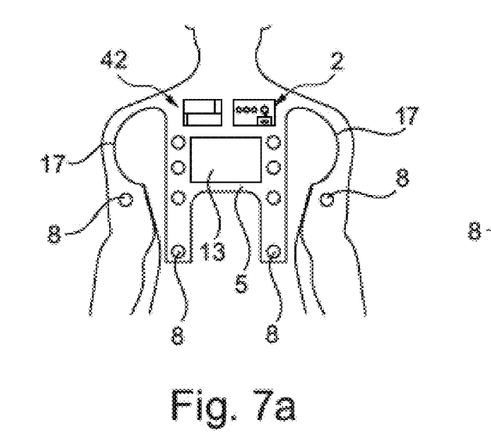
FIGS. 7A-7E: flowchart of a hit scenario

According to FIG. 7a, the training device 1 has only one pad 13 in the chest area of the upper body 15. The training device 2 is supplied with power by an additional battery 42.

Figure 7B:
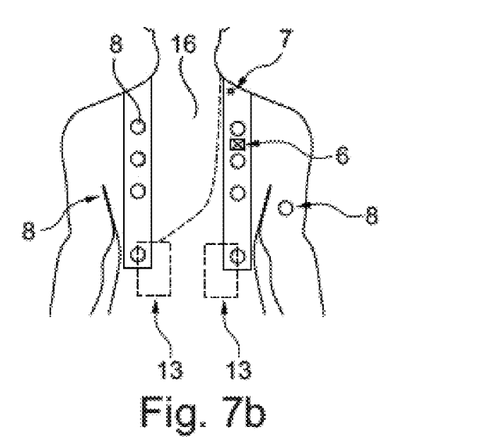

In FIG. 7b, the training person 11, 12 is shown from behind. Here, too, the vest 17 has a plurality of receiving units 8 which detect the laser signal 28 from an opposing laser unit 9. Two pads 13 are arranged in the area of the back 16, which contract the individual muscles there by means of a current pulse.

Figure 7C:
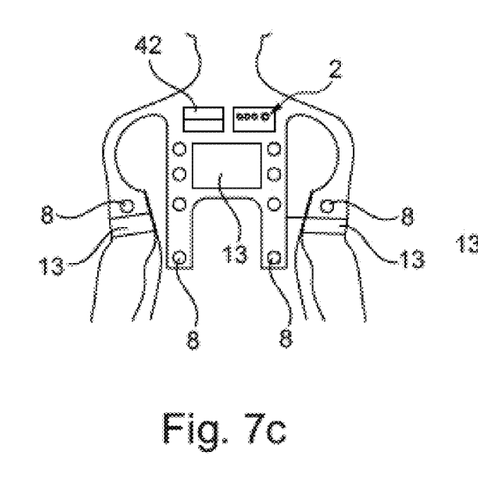

FIG. 7c shows the training person 11, 12 from the front. Both a receiving unit 8 and a pad 13 are arranged on both arms 17. This makes it possible that when a hit is detected in the area of the arm 17, the respective pad 13 is only supplied with current there and causes pain there.

Figure 7D:
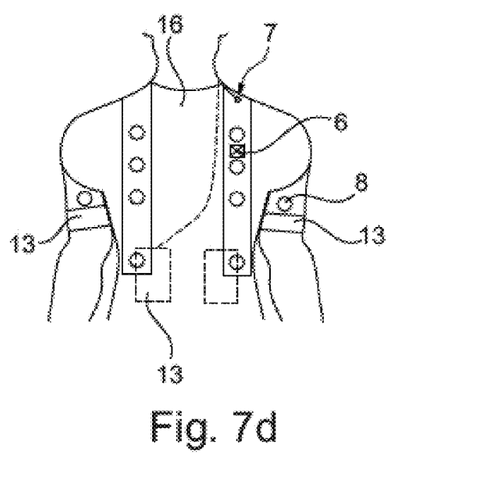

FIG. 7d shows the back 16 of the training person 11, 12, with the vest 5 having a vibration module 6 with which a hit is additionally represented by a vibration. In addition, the vest 5 has a light module 7 which indicates the hit with a light signal.

Figure 7E:
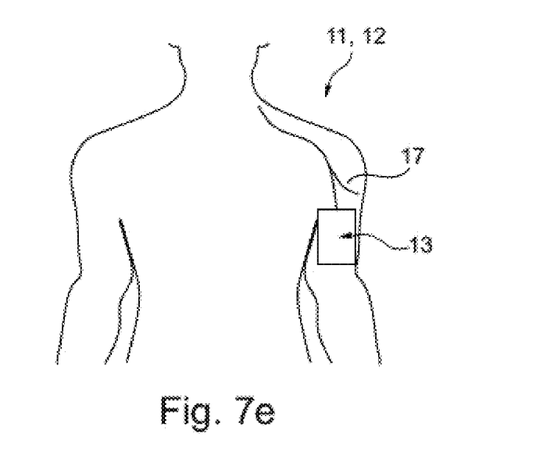

FIG. 7e shows the arrangement of a pad 13 on the arm 17 of the training person 11, 12. The pad 13 is designed as a type of cuff and can thus be securely attached to the upper arm.

Figure 8:
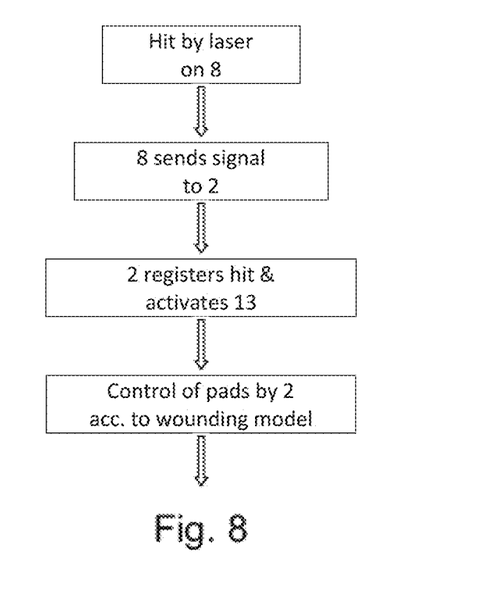
FIG. 8: representation of the simulation program

FIG. 8 again shows the procedure after a hit has been made. The laser signal 28 is detected by the receiving unit 8. The receiving unit 8 sends a signal to the central unit 2. The central unit 2 registers the hit and activates a program, whereby a specific pad 13 receives a current pulse.

The programs can also be configured individually before each training to suit the user's sensitivity to pain. This ensures that no user is overwhelmed in their capacity to endure pain. This individual configuration cannot be manipulated from outside or by third parties. It is controlled exclusively by the respective user. The training device also has an emergency stop switch, which is ergonomically arranged so as to ensure quick operation. If the user experiences overstimulation, he is able to deactivate the system immediately.

The central unit 2 controls all functions from individual configuration to hit registration via the corresponding receiving units 8 on the body. In addition, the hit is signaled by means of a light module 7 (LED). The control of the pain simulation of the wounding models including all scenarios (hits, movements, bleeding time) with the possible result of neutralization is carried out by the central unit 2. The central unit 2 is the central brain and client of all functional processes that are activated in the event of one or more hits.

LEGEND FOR DRAWINGS

1. Training device
2. Central unit
3. Controller
4. Belt
5. Vest
6. Vibration module
7. Light module
8. Receiving unit
9. Laser unit
10. Helmet
11. Training Team A
12. Training Team B
13. Pad
14. Connecting cable
15. Upper body
16. Back
17. Arm 18. Leg
19. Abdomen
20. Base station
21. Software of 20
22. Acceleration sensor (G-sensor)
23. Simulation mode (normal)
24. Simulation mode (movement)
25. Hit no. 1
26. Hit no. 2
27. Weapon
28. Laser signal
29. Memory
30. Data
31. Rehabilitation module
32. Electrode
33. Connector
34. Sensor
35. ON/OFF switch
36. Switch
37. Radio module
38. Memory
39. Pulse generator
40. Activation sensor
41. Push button
42. Battery
43. Stimulation current

The invention claimed is:

1. A training device with a laser-assisted weapon comprising:
a central unit,
at least one receiving unit,
laser units, wherein the laser unit of a first training person is arranged on a first weapon and emits a laser signal in the direction of a receiving unit of a second training person, wherein the laser unit of a second training person is arranged on the second weapon and emits a laser signal in the direction of a receiving unit of the first training person,
at least one person-worn pad that can be energized with stimulation current, and
an acceleration sensor that detects a movement of the first or second training person,
wherein, when the laser signal is detected by the at least one receiving unit, the detected laser signal is evaluated as a hit by the central unit, and the central unit sends at least one current pulse to the at least one pad,
wherein when a hit is detected, the at least one pad delivers a wave-like varying stimulation current, which causes muscular contraction pain in the first or second training person, and
wherein intensity of the wave-like varying stimulation current that is delivered is determined based on location of the at least one pad on the first or second training person when worn and on whether the acceleration sensor detects movement of the first or second training person after the hit is detected,
wherein when the acceleration sensor determines that the first or second training person is moving after the hit is detected, the intensity of the wave-like stimulation current is increased, and when the acceleration sensor determines that the first or second training person is not moving after the hit is detected, the intensity of the wave-like stimulation current is decreased.

2. The training device according to claim 1, wherein the wave-like varying stimulation current is non-pulse-like.

3. The training device according to claim 1, wherein the central unit has a controller which delivers the stimulation current to the first or second training person over a certain period of time according to a predetermined simulation mode.

4. The training device according to claim 3, wherein when the first or second training person moves, the controller of the central unit delivers an increased stimulation current according to a simulation program.

5. The training device according to claim 1, wherein for certain body parts of the first or second training person, each pad of the at least one pad arranged there is assigned a respective receiving unit of the at least one receiving unit.

6. The training device according to claim 1, wherein separate pads of the at least one pad are provided for each of an upper body, a back, arms and/or legs of the first or second training person, which are controlled by the central unit in a targeted manner.

7. The training device according to claim 1, wherein the at least one pad comprises a plurality of pads, and the central unit has a plurality of connections for the plurality of pads, the connection being either contactless or wired.

8. The training device according to claim 1, wherein the central unit has a device for pulse rate measurement.

9. The training device according to claim 1, wherein the at least one pad has at least one sensor for pulse measurement.

10. The device of claim 1, wherein the training device is configured to increase the intensity of the stimulation current when movement of the first or second training person is detected by the acceleration sensor.

11. The device of claim 1, wherein the training device is configured to decrease the intensity of the stimulation current when no movement of the first or second training person is detected by the acceleration sensor.

12. The method of claim 1, wherein the training device further comprises a memory for storing several different simulation modes, wherein after each hit the wave-like varying stimulation current with different voltages is delivered to the trainee over a predetermined period of time.

13. A method for carrying out a realistic combat situation with a training device with a laser-assisted weapon comprising a central unit, at least one receiving unit, a laser unit, wherein the laser unit of a first training person is arranged on a first weapon and emits a laser signal in the direction of a receiving unit of a second training person, wherein the laser unit of a second training person is arranged on the second weapon and emits a laser signal in the direction of a receiving unit of the first training person, at least one person-worn pad that can be energized with stimulation current, and an acceleration sensor that detects a movement of the first or second training person, comprising:
detecting the laser signal by the at least one receiving unit,
when the laser signal is detected by the at least one receiving unit, identifying the detected laser signal as a hit by the central unit,
detecting, by the acceleration sensor, whether the first or second training person is moving, and
sending, by the central unit, at least one current pulse to the at least one pad,
determining an intensity of a wave-like varying stimulation current based on location of the at least one pad on the first or second training person when worn and on whether the acceleration sensor detects movement of the first or second training person after the hit is detected,
when the hit is detected, delivering by the at least one person-worn pad, the wave-like varying stimulation current having the determined intensity, which causes muscular contraction pain in the first or second training person, when the acceleration sensor determines that the first or second training person is moving after the hit is detected, increasing the intensity of the wave-like stimulation current, and when the acceleration sensor determines that the first or second training person is not moving after the hit is detected, decreasing the intensity of the wave-like stimulation current.

14. The method of claim 13, wherein the training device increases the intensity of the stimulation current when movement of the first or second training person is detected by the acceleration sensor.

15. The method of claim 13, wherein the training device decreases the intensity of the stimulation current when no movement of the first or second training person is detected by the acceleration sensor.

* * * * *